April 15, 1941.  C. R. BUSCH  2,238,100
BRAKE HEAD AND MOUNTING THEREFOR
Filed Nov. 24, 1939  5 Sheets-Sheet 1
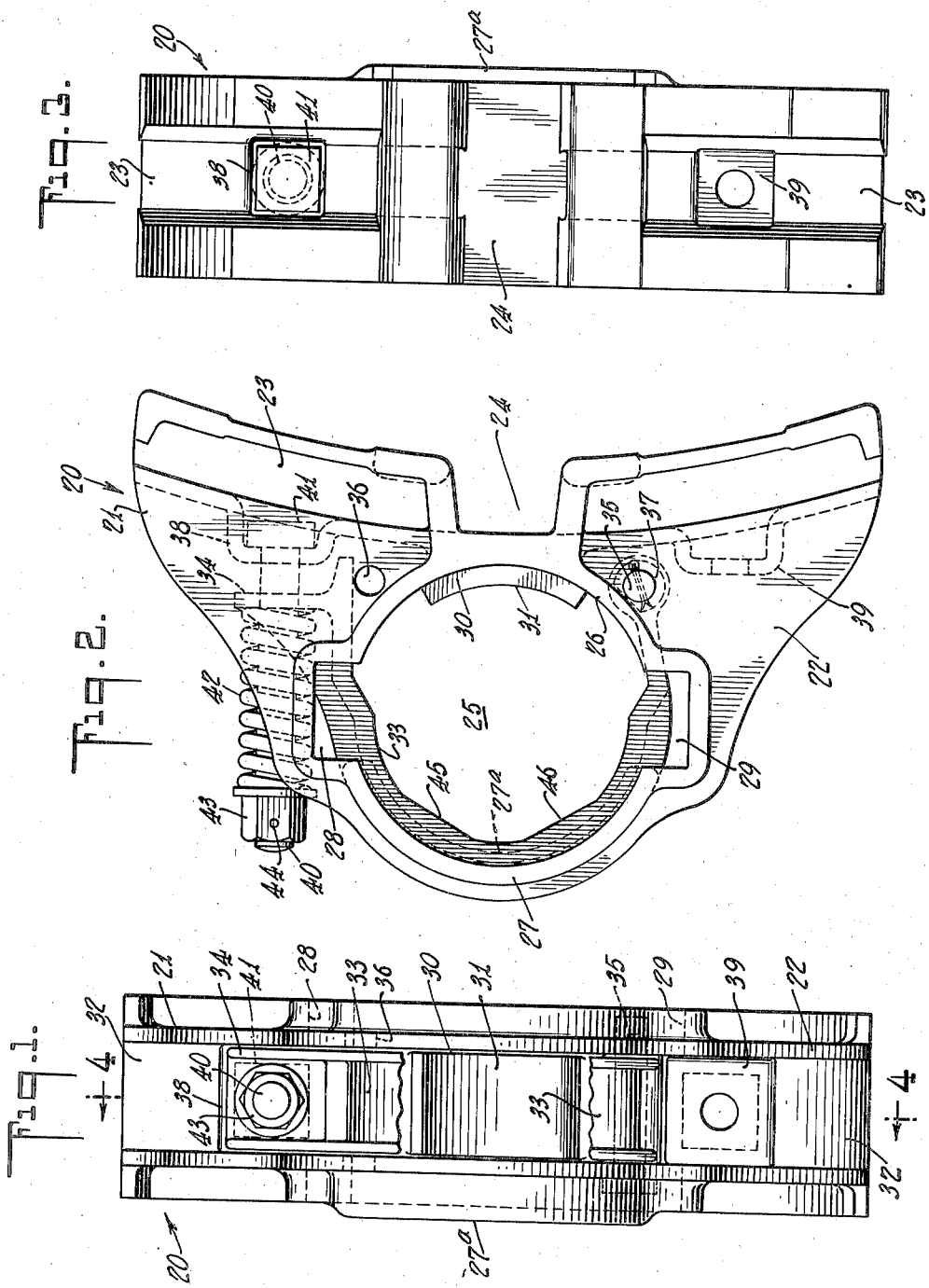
INVENTOR
Charles R. Busch.
BY Geo. T. Wheelock
ATTORNEY

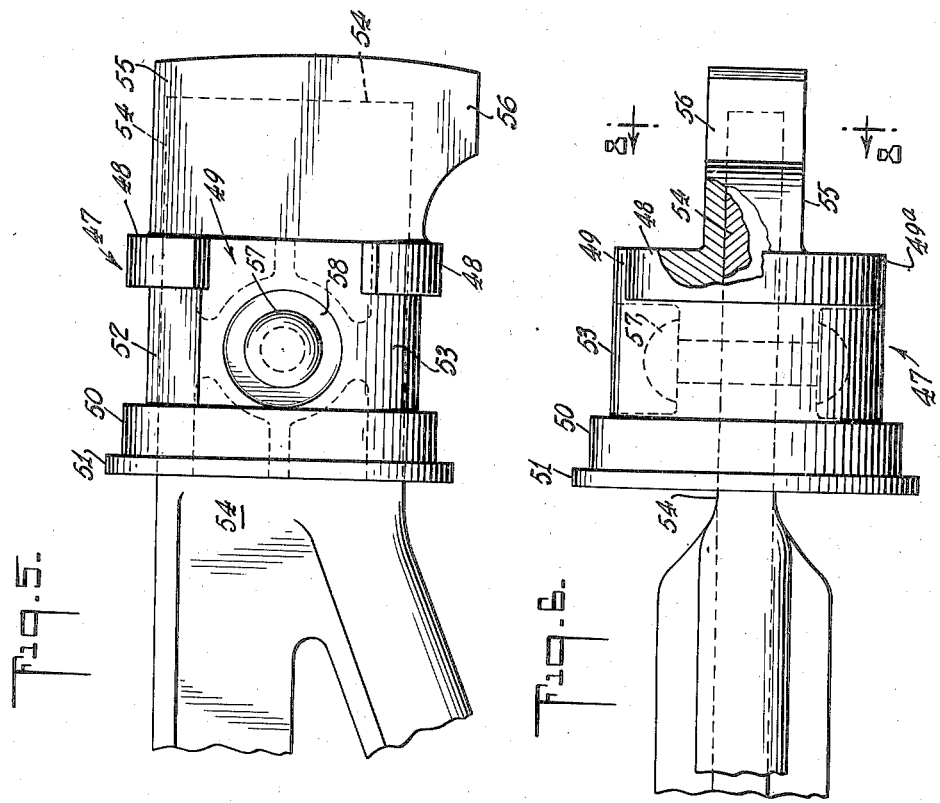

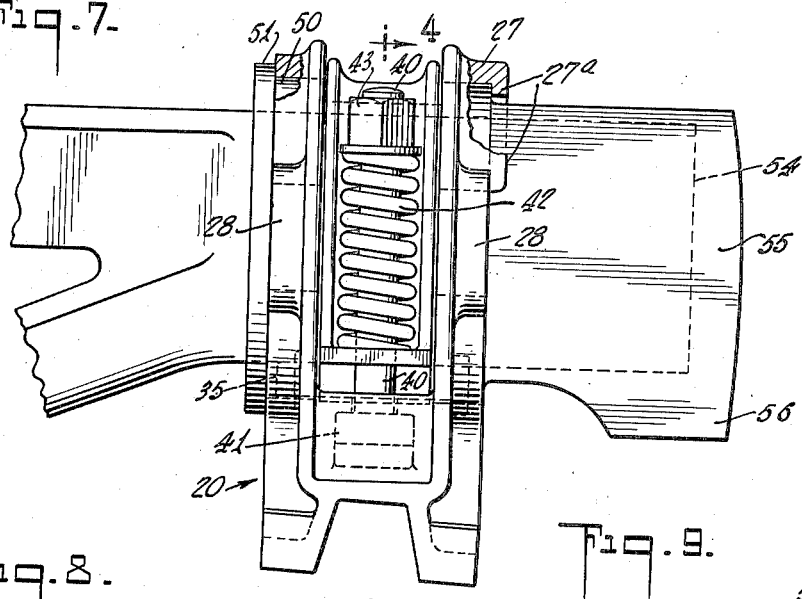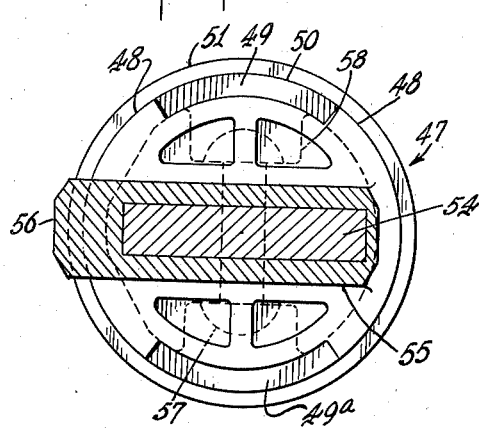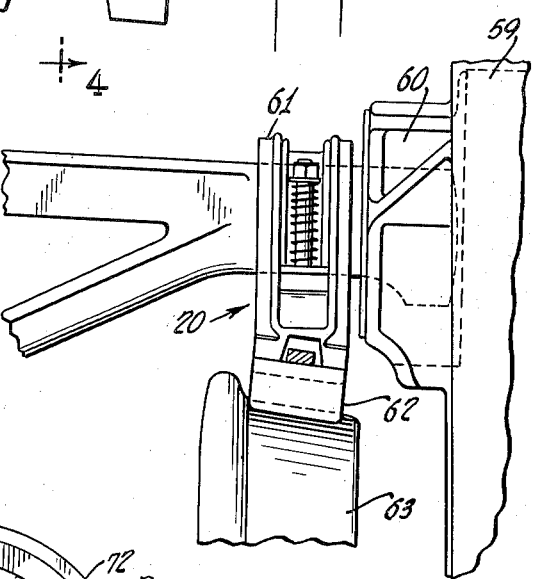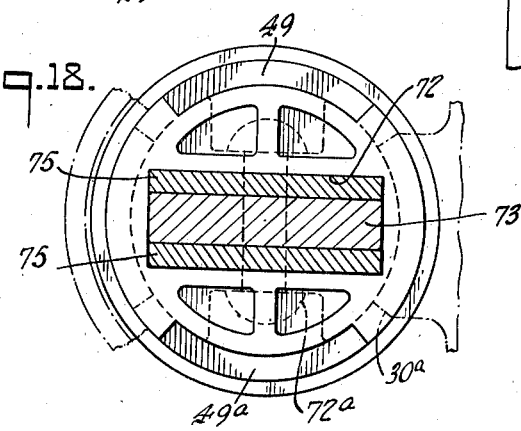

April 15, 1941.　　　　C. R. BUSCH　　　　2,238,100
BRAKE HEAD AND MOUNTING THEREFOR
Filed Nov. 24, 1939　　　5 Sheets-Sheet 4
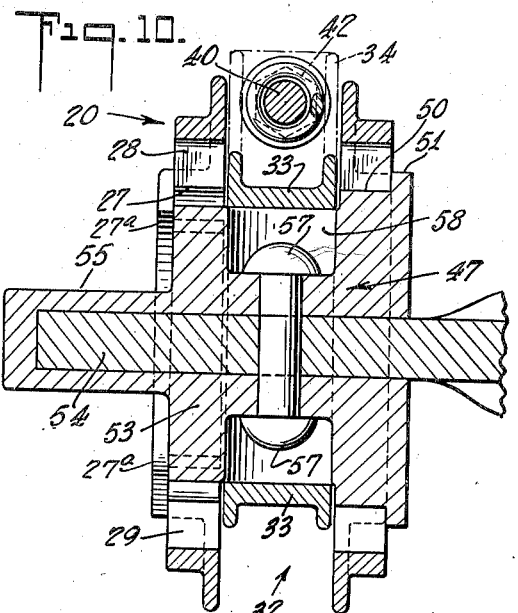
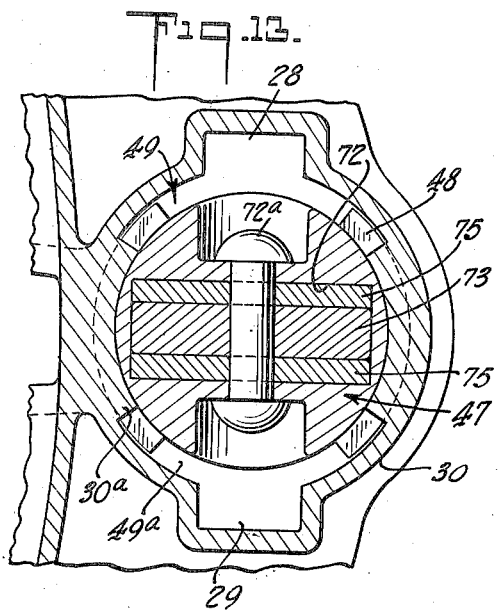
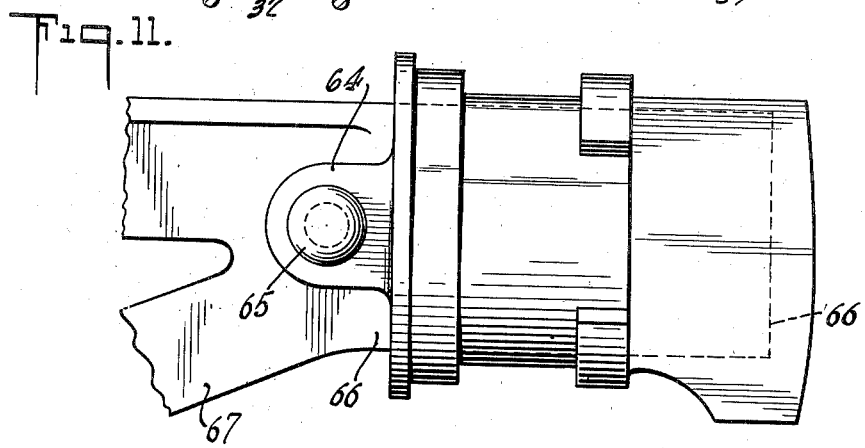
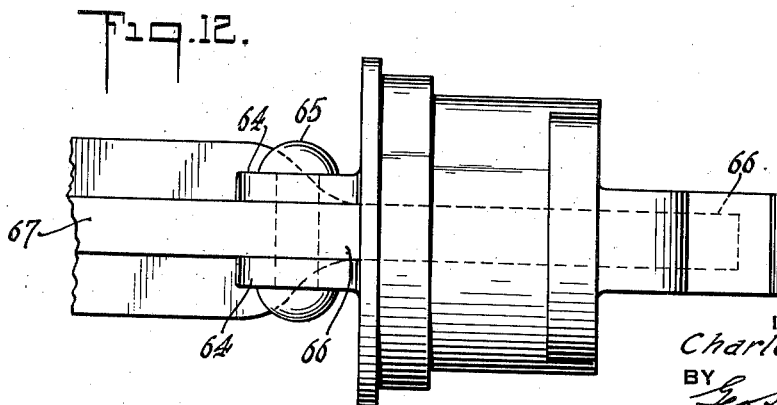
INVENTOR
Charles R. Busch.
BY
ATTORNEY

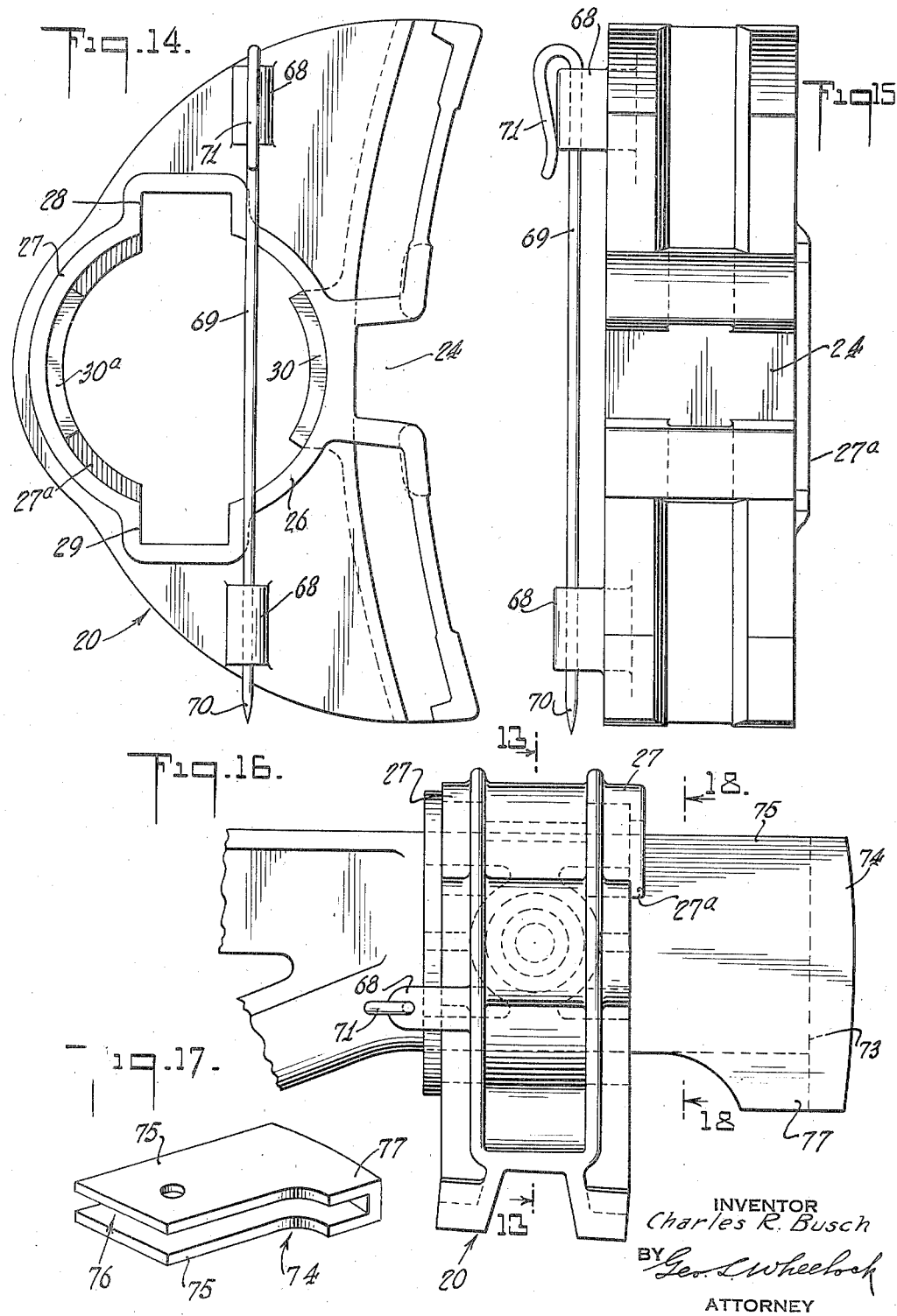

Patented Apr. 15, 1941

2,238,100

UNITED STATES PATENT OFFICE 2,238,100

BRAKE HEAD AND MOUNTING THEREFOR

Charles R. Busch, Orange, N. J., assignor to Buffalo Brake Beam Company, New York, N. Y., a corporation of New York Application November 24, 1939, Serial No. 305,789

30 Claims. (Cl. 188—230)

The present invention relates to improvements which are more or less applicable to the car truck of Patent 2,170,112, the brake beams of Patents 2,170,113 and 2,170,116, all dated August 22, 1939, as well as to the disclosures of my pending application, Serial No. 180,962, filed December 21, 1937, for improvements in Brake beams, covered by Patent No. 2,193,580, dated March 12, 1940, although the present improvements are modifications of the inventions shown, described and claimed therein; while the present improvements are not only applicable to brake heads and mountings therefor which are adapted to be guided on guides of car truck side frames, but certain features of the present invention are applicable to the types of brake beams which are suspended from the hangers pivotally connected with the brake heads on the beams.

The preferred objects of the present invention are to provide an interlocking, self-centering, adjustable brake head which is adapted to be maintained at predetermined centers on the brake beam and in proper co-relation with respect to the car wheels, and to provide such brake head with automatic means for maintaining the head at right angles to the plane in which the brake beam operates in applying or releasing the brake, such type of adjustable brake head being preferable when the beam is supported from spring-supported side frames, to permit of proper contact of the brake-shoes with the wheels. The type of beam as shown in my said patents and pending application, as well as in other of my patents, being without any brake hangers or the like, positive centering means for the beam, brake heads and shoes are best used and may be necessary.

These being among the objects of the present invention, the same consists of certain features of construction and combinations of parts to be hereinafter described and then claimed with reference to the accompanying drawings illustrating preferred embodiments of the invention and wherein:

Figure 1 is a rear elevation of a brake head, partly broken in its middle portion;

Fig. 2 is a side elevation of such head, parts being shown in broken lines;

Fig. 3 is a front elevation of such brake head;

Fig. 4 is a vertical section on the lines 4—4, Fig. 1 and Fig. 7, showing such brake head mounted on a brake beam, and parts shown in broken lines;

Fig. 5 is a plan view of one end of a brake beam illustrating a form of brake head mounting or sleeve secured on the beam;

Fig. 6 is a front elevation of Fig. 5, i. e., looking toward the front of the beam;

Fig. 7 is a plan view of one end of a brake beam showing the preferred brake head mounted thereon, parts being in broken lines;

Fig. 8 is a transverse section on line 8—8 of Fig. 6, looking in the direction of the arrows;

Fig. 9 is a fragmentary view, showing parts of a side frame, a truck wheel and a brake beam guided on the side frame, the preferred brake head being shown as mounted on the beam;

Fig. 10 is a vertical section on the line 10—10 of Fig. 4, looking in the direction of the arrows;

Fig. 11 is a broken plan of one end of a brake beam, showing a modified construction of mounting for the head secured on the beam;

Fig. 12 is a front elevation of the end of the beam and the mounting shown in Fig. 11;

Fig. 13 is a transverse section on the line 13—13 of Fig. 16, looking in the direction of the arrows, which discloses a modified form of construction.

Fig. 14 is a side elevation of a modified construction of brake head;

Fig. 15 is a front elevation of the same, that is, as viewed toward the key-way;

Fig. 16 is a plan of one end of a brake beam showing the modified construction of brake head mounted thereon;

Fig. 17 is a perspective view of a protecting cap or shoe for that portion of the brake beam which is guided on the truck side frame; and Fig. 18 is a section on the line 18—18, Fig. 16, looking in the direction of the arrows, parts being in broken lines.

The preferred construction of brake head is more particularly illustrated in Figs. 1-4 and Fig. 10, and the solid or fixed parts of the head 20 are preferably made in the usual manner from a single malleable steel casting. The illustrated head is of a symmetrical shape, that is to say, it is preferred that the two halves 21, 22 of the head be identical with each other, to each side of the central transverse plane of the head. The face of the head is provided with a longitudinal key-way 23, which, midway of its length, is intersected by a shoe-lug receiving recess 24; or the head may be constructed in any other suitable manner for rigidly supporting a brake-shoe.

An annular transverse opening 25 extends entirely through the back of the head 20, such opening having an arcuate front wall 26 and an arcuate back wall 27, the recess 24 lying centrally disposed in front thereof. That side of the head which would be nearest toward the end of the brake beam, that is, the corresponding edge of the wall 27, is provided with an inward flange 27a.

In the head-half 21 there is a recess 28, and in the head-half 22 a recess 29. These recesses are diametrically in alignment, or one directly opposite and facing the other, and both of them merging with the transverse opening 25. Projecting inwardly in the opening 25 is a tongue or projecting bearing-member 30, which is disposed back of the shoe-lug recess 24, its location being midway of the recesses 28, 29. Such tongue or equivalent member is provided with an arcuate bearing surface 31, which is concentric with the walls 26, 27 surrounding the transverse opening 25. Such surface 31, as well as the arcuate surfaces of the brake head, constitute bearing surfaces for purposes to be hereinafter explained.

The improved brake head is provided with a vertical centrally-disposed slot 32 extending through the back of the head, in which there is adapted to act a generally arcuate member 33, which serves as a clamp. The curved portion of the clamp 33 extends approximately one-half of the circumference of the transverse opening 25 in the head. Such clamp extends from a point below the tongue 31 to a point above it, and at its upper end it is provided with a transverse seat-portion 34. A pivot 35 is located on the lower end of the clamp, which pivot may be mounted in either one of the holes 36, 37 respectively located above and below the tongue 30, for the purpose to be hereinafter described.

The upper half 21 of the head is provided with a perforated depressed seat 38, and the lower half 22 of the head is provided with a similar seat 39, both of these seats opening into the key-way 23. A bolt 40 or the like is provided with a square head 41, which, in the case illustrated, is received in the seat 38 and passes rearwardly therethrough, and also through the seat 34 on the clamp. A helical spring 42 surrounds the bolt for a length thereof between the seat 34 and a nut 43 on the threaded end of the bolt, for changing the tension of the spring as desired. After the brake head has been mounted in position in the manner hereinafter described, a cotter pin 44 may be passed through the bolt and the nut to prevent the latter from turning.

Intermediately of the ends of the clamp 33 it is provided with diverging flat bearing surfaces 45, 46, which are preferably located opposite the tongue 30, for performing the function hereinafter specified.

Now referring to Figs. 4, 5 and 6, the preferred mounting sleeve is illustrated, and upon which the brake head is adapted to be rocked more or less, depending upon the exact position in which a brake-shoe is centered with respect to a car wheel. The mounting 47 is of generally cylindrical shape, preferably of malleable cast steel, and is provided with a rim or rib 48 extending partly around the outer end thereof, and said rim has recesses 49 extending partly around the mounting. A preferably complete annular rim 50 extends around the opposite end of the mounting and is provided with an annular shoulder 51 which furnishes an abutment for the brake head when it is in operative position.

Said mounting 47 has diverging flat surfaces 52, which preferably are of considerable area, and are formed on the main cylindrical body 53 which extends from rim 47 to rim 50. These flat surfaces 52 correspond with the flat surfaces 45, 46 on the brake head clamp and act as hereinafter described.

The brake beam may be of truss type, as covered in one of my aforesaid patents, and it is provided with a preferably flat end-extension 54, which passes through the mounting 47. A flat lug 55 extends diametrically and horizontally from the outer end of the mounting 47, and the same is of substantial area at top and bottom so as to be properly guided on a car truck side frame. This lug or guiding extension is preferably integral with the mounting, and is hollow, so that the end-extension 54 of the beam may be snugly received therein.

At the front side of the lug 55 the same is provided with a lateral projection or nose 56, so as to provide ample bearing surfaces for the end of the beam, thereby tending to eliminate the rocking of the beam when in operation, as shown, described and claimed in my aforesaid Patent No. 2,193,580, dated March 12, 1940. Preferably, a strong rivet 57 passes diametrically through the mounting 47 and the beam-extension 54 in order to rigidly connect them together, and the heads of such rivet are countersunk in diametrically opposite cavities 58 in the cylindrical body 53 of the mounting, or the said members may be rigidly connected together in any other well-known and suitable manner. Figs. 4, 7 and 9 show the combined brake beam, mounting and rockable brake head thereon. From these figures, and some of the others with respect to the preferred form of the invention, the manner of assembling the said members together will be understood from a description thereof as follows: The mounting 47 is inserted over the extended end 54 of the brake beam, the recess 49 of the mounting being nearest the terminal of the brake beam, and the shoulder 51 being located inwardly along said end 54. The flat surfaces 52 of the mounting will be disposed back of the beam, one bearing surface 52 extending upwardly and inclined inwardly, and the other bearing surface extending downwardly and inclined inwardly.

Thereafter, the mounting and brake beam are rigidly secured together. The form of the type of brake head shown in Figs. 1 to 4 may then be mounted upon the assembled beam and the mounting 47. To do this, the upper end of the clamp 33 is released from the bolt 40 and the spring 42 by removing the bolt by its head 41, the bolt being pulled forwardly through the key-way and from the brake head. Then, the clamp 33 mounted on pin 35 is swung outwardly, so that it is clear of the recesses 28, 29 in the halves of the head.

When the clamp has been swung back far enough on the preferably symmetrical head 20, it is moved to such a position relative to the extended end 54 of the beam that one of the recesses 28, 29 will allow the head to be moved clear of the laterally-extended portion 56 onto the mounting 47. In thus moving the head onto the beam, its tongue 30 is to be in a position above the brake beam in registry with opening or recess 49, so that the head can be pushed in as far as possible so as to abut the shoulder 51 and position the tongue 30, whereupon the head may be rotated through an angle approximately 90° and bring the side of the tongue 30 into bearing relation with the inner side of the rim or rib 48. When the head is pushed in to abut the shoulder 51 the flange 27a at the opposite side of the head is brought into bearing relation with the outer end of the mounting or sleeve 49, so that said flange serves to eliminate some of the wear on said shoulder 51 when the head is rocked.

If the lower end of the clamp has not received the pivot 35 for mounting it at the lower half of the brake head, such a pin is inserted through the hole 37 therein and through said end of the clamp, such pin being removable, and in any suitable manner the pin may be held against accidental removal.

The pivoted clamp is swung inwardly and around the flattened portions 52, 52 of the mounting so as to bring the corresponding flat surfaces 45, 46 of the clamp into bearing relation and registration with the flat surfaces 52, 52. Then, the bolt 41 is passed through the seat 38 and through a hole in the clamp-seat 34, whereupon the helical spring 42 is placed over the bolt and the nut 43 screwed thereonto. In this manner the clamp is subjected to spring pressure for tending to hold the brake head in proper braking position.

Inasmuch as the head is preferably symmetrical, having identical upper and lower halves, and as it may be applied to the mounting in the manner described, the brake head is reversible, that is to say, it may be used as a right or a left on the opposite ends of the brake beam. In order to convert the brake head into a right or a left, and it is assumed in Figs. 7 and 9 that the brake head is used as a right, the corresponding seats 38, 39 and holes 36, 37 are provided in the identical halves of the brake head. It will be seen that when the brake head is to be used as a left, and is mounted upon a similar mounting in the manner above described, the pivot-pin 35 may be inserted through the hole 36, which would then be below the brake beam, and through the lower end of the clamp, and the seat 39, which would now be above the brake beam, would serve as the support for the bolt 40, etc.

The flat bearing surfaces of the mounting and the clamp tend to maintain the brake head in vertical position, inasmuch as the clamp 33 is spring-pressed against the mounting 47. When the shoe on the brake head is brought to bear on the tread of the adjacent car wheel, the shoe will be centralized thereon, due to the fact that the head is automatically adjusted or rocked upon the mounting 47, and when the braking pressure is released the head will be automatically moved back to its position at rightangles to the beam, through the action of the spring 42 and the flat bearing surfaces of the mounting and clamp.

In Fig. 9 the end of the brake beam is shown as supported on the truck side frame 59 by means of guides 60, according to my aforesaid patents, said beam supporting a brake head 61 of the type described, which, in turn, has a brake-shoe 62 keyed thereon, the face of the shoe being inclined, as shown, so as to conform to the coning of the wheel 63, substantially in accordance with my aforesaid patents.

Figs. 11 and 12 show a modified construction of mounting sleeve adapted for use with the brake head of Figs. 1, 2 and 3, one difference being that the rivet hole through the sleeve is omitted, and there is substituted therefor a pair of ears 64 extending inwardly from the open inner end of the sleeve or mounting, and spaced apart to fit onto the end of the brake beam. Through these ears and the beam a rivet 65 is preferably passed for rigidly connecting the mounting and the beam. Another omission is the diverging flat surfaces, inasmuch as this type of mounting, without them, is more particularly intended for use with the modified brake head shown in Figs. 14 and 15. The beam shown is of a different type from that shown in Figs. 5 and 6, its endportion 66 being T-shaped in cross-section to receive the ears on its flat forward part adjacent to the tension-member 67. Owing to this T-shaped cross section of the beam, the ears 64 may be arranged so that the perforations therein extend diametrically of the mounting, that is, midway of the breadth of the beam end 66, this type of beam having flat upper and lower surfaces.

Figs. 13 to 18 inclusive illustrate a modification of the combination of beam, brake head and mounting sleeve, which, except for features different from the main combination, have similar reference numerals. The modification of the brake head resides in a pair of perforated lugs 68, preferably in alignment at the inner side of the head, one lug being on the upper, and the other on the lower, half of the head.

A resilient member 69 is inserted through the perforations of said lugs, said member being preferably in the form of a straight bar made of heavy wire-spring metal. The lower end 70 of the resilient member is tapered to facilitate engagement with the lugs 38, and the upper end of said member is provided with a clip 71 formed by bending the member back upon itself. When the resilient member is engaged in the perforated lugs, the clip 71, being resilient, snaps onto the upper lug 68 with considerable pressure—sufficient to prevent the vibrations of the brake mechanism, etc., from throwing the member out of engagement with the lugs.

The mounting for supporting the head upon the brake beam is provided with a diametrical longitudinal opening 72 of such ample dimensions as to be sufficient for receiving the beam end 73 as well as a cap or shoe 74 made of metal preferably harder than that of the beam, for protecting the extended end of the beam against wear. The cap or shoe 74 is illustrated in Fig. 17, and is preferably formed from a metal plate which is bent into a substantially U-shaped section, longitudinally thereof, so as to provide upper and lower side walls 75, which are separated a suitable distance apart at 76 for receiving the end 73 of the brake beam. The end of the beam, where it extends beyond the near side of the mounting, is thereby protected on its upper, lower and terminal surfaces against wear during the operation of the brake beam on a truck side frame. Preferably, this cap 74 is provided with a laterally-extended bearing-portion or nose 77.

To combine the brake beam, mounting and brake head, as shown in Figs. 13, 16 and 18, the parallel walls 75 of the cap 74 are pushed into the opening 72 of the mounting, and thereafter the extended end of the beam is inserted snugly in the space between said walls. When the said parts are thus assembled, a rivet 72a or the like serves to rigidly connect them together. Finally, the modified form of brake head is applied to the beam and the mounting substantially in the same manner as in the previously described combination of these parts. There is a principal exception, however, in that after completion of the assembly the resilient member 69 is passed through the side lugs 68 and through the brake beam, which is located about midway of said lugs. Of course, the resilient member 69 is pushed down far enough so that the clip 71 will strongly engage with the upper lug 68.

In the described modification of the complete combination it will be seen that the rockable brake head will be normally set in an adjusted position substantially at right angles to the brake beam by means of the flexible resilient member 69 which extends approximately at its midlength through the brake beam. As both halves of the brake head are subjected to the direct action of the ends of the resilient member 69, it will be seen that when the brake head is rocked, due to the pressure resulting from applying the brake to a car wheel, the resilient member will be placed under tension, and the brake-shoe will adjust itself to the tread of the car wheel. When the brake is released the head and shoe will be automatically restored to normal position.

Obviously the invention may be modified in any desirable manner apparent to those skilled in the art without departing from the scope of the appended claims.

What I claim as new is:

1. A brake head having a transverse mounting receiving opening in its back, and a beam clearance recess intercepting the opening at one of the upper and lower parts of the head, such recess adapted to register with and clear a lateral projection on, and in the plane of, the beam before the head is placed on the mounting.

2. A brake head having a transverse mounting receiving opening in its back, and beam clearance recesses intercepting the opening at the upper and lower parts of the head, the head having a tongue projecting into the opening at a place midway of said recesses, each of such recesses adapted to register with and clear a lateral projection on, and in the plane of, the beam before said tongue performs its own function.

3. A symmetrical brake head with similar halves and having a transverse, annular, mounting receiving opening midway of its back, a clamp extending upon the back of the head parallel with the sides thereof, and the inner side of the clamp curved approximately to the wall of the opening and protruding inwardly beyond said wall, and means for interchangeably pivotally mounting either end of the clamp on either half of the head, whereby the head may be used either as a right or left, each half of the head having a transverse hole for receiving the clamp pivot, and and the holes located in approximate corresponding positions.

4. A brake head having a transverse, annular, mounting receiving opening midway of its back, the halves of the head corresponding, a clamp extending upon the back of the head parallel with the sides thereof, and the inner side of the clamp curved approximately to the wall of the opening and protruding inwardly beyond said wall, correspondingly located front facing seats in the head halves, correspondingly located holes between said seats, a removable pin in one of said holes and on which one end of the clamp is pivoted, and spring means mounted on the one of said seats adjacent the other hole for acting on the other end of the clamp, whereby the clamp is rendered reversible and mountable end for end.

5. A brake head having a transverse, annular, mounting receiving opening midway of its back, the halves of the head corresponding in function for use with either half disposed above the other, whereby the head is rendered reversible, a clamp extending upon the back of the head parallel with the sides thereof, and the inner side of the clamp curved approximately to the wall of the opening and protruding inwardly beyond said wall, and a tongue projecting inwardly from the front portion of the head into said opening, and located in front of the midlength of the clamp, said tongue disposed at the same distance from the outer end of each half.

6. A brake head having a key-way and a transverse, annular, mounting receiving opening midway of its back, and a tongue projecting from the head inwardly into the opening and away from the key-way, and located approximately midway of the length of the key-way, and a pair or lugs at one side of the head, one lug on each end of the head, and said tongue located between the lugs, the lugs adapted to be engaged with a flexible resilient member to extend longitudinally of the head.

7. A brake head having a transverse mounting receiving opening in its back, and beam clearance recesses intercepting the opening at the upper and lower parts of the head, and a pair of substantially aligned lugs at one side of the head, one lug on each end of the head and located adjacent a corresponding recess, the lugs adapted to be engaged with a flexible resilient member.

8. A rockable brake head provided with a transverse mounting receiving opening in its back, a flexible resilient member extending lengthwise of the head, and means for detachably mounting the ends of said member on both ends of the head when the resilient member is pushed lengthwise into such means.

9. A rockable brake head provided with a transverse mounting receiving opening in its back, a flexible resilient member extending lengthwise of the head, and a pair of lugs at one side of the head, one at each end, said lugs having perforations in which the resilient member is removably inserted.

10. A brake head having a key-way and a transverse, annular, mounting receiving opening midway of its back, and a tongue projecting from the head inwardly into the opening and away from the key-way, and located approximately midway of the length of the key-way, in combination with a mounting body extending through the annular head opening, such body adapted to be rigidly secured to a brake beam, means on one end of said body in interlocking engagement with the head tongue, and means on the other end of the body against which the head abuts, the head rockable on the mounting body, and a spring-pressed clamp on the head adapted to engage the body at points between the interlocking means and the head abutment means, the clamp and the mounting body provided with flat surfaces in mutual bearing relation serving to return the head from its rocked position.

11. A brake head having a key-way and a transverse, annular, mounting receiving opening midway of its back, a spring-actuated clamp mounted on the head and parallel with the sides thereof, the inner edge of the clamp protruding inwardly beyond the wall of the opening, in combination with a mounting body extending through said head opening, the head being rockable on said body, and means confining the head on said body, said body having a generally cylindrical portion provided with a non-cylindrical bearing surface formed as the chord of a circle, and the protruding edge of the clamp having a surface complementary to said bearing surface and bearing thereupon, whereby the head is brought back to original position by the clamp after it has been rocked.

12. A mounting for assembling a brake head with a brake beam, the same comprising a generally cylindrical body on which a brake head may rockably bear, and a substantial beam guiding lug extending from one end of the cylindrical body in a plane diametrical thereof.

13. A mounting for assembling a brake head with a brake beam, the same comprising a generally cylindrical body on which a brake head may rockably bear, and a substantial beam guiding lug extending from one end of the cylindrical body in a plane diametrical thereof, such lug being hollow to receive the end of a beam.

14. A support for the end of a brake beam, and adapted to also support a rockable brake head, including a generally cylindrical mounting or body, in combination with a brake beam received and rigidly held at one end in the mounting, and the mounting having at one end a pair of similar projecting rims concentric therewith, said rims being spaced apart to provide two corresponding recesses lying above and below the beam and adapted for the passage of a portion of a brake head to the inner sides of the rims regardless of whether the mounting is on one end or the other of the beam, and the mounting also having, between said rims and the shoulder, flat surfaces inclined oppositely at the back of the beam.

15. A support for the end of a brake beam, and adapted to also support a rockable brake head, including a generally cylindrical mounting or body, in combination with a brake beam received and rigidly held at one end in the mounting, and a substantial beam guiding lug extending from one end of the cylindrical mounting in a plane substantially that of the operative plane of the beam.

16. A support for the end of a brake beam, and adapted to also support a rockable brake head, including a generally cylindrical mounting or body, in combination with a brake beam received and rigidly held at one end in the mounting, and a substantial beam guiding lug extending from one end of the cylindrical mounting in a plane substantially that of the operative plane of the beam, the extremity of the lug having a nose extending forwardly with respect to the beam.

17. A support for the end of a brake beam, and adapted to also support a rockable brake head, including a generally cylindrical mounting or body, in combination with a brake beam received and rigidly held at one end in the mounting, and a substantial beam guiding lug extending from one end of the cylindrical mounting in a plane substantially that of the operative plane of the beam, and a rivet passing through the beam and diametrically through the mounting to secure them together.

18. A support for the end of a brake beam, adapted to also support a rockable brake head, including a generally cylindrical mounting or body having a diametrical opening from end to end, in combination with a brake beam extending through and terminating beyond the opening, a shoe or cap of wear metal extending around the end of the beam, both within said opening and beyond it, to protect the terminal portion of the beam, and closely fitting the beam and the opening, and means for rigidly securing together the beam, shoe and mounting.

19. In combination, a brake beam, a brake head and a mounting rigid with the beam and upon which the brake head is rockably supported, the mounting of generally cylindrical shape, and the head provided with an annular transverse opening the wall of which surrounds and bears on the mounting, and means for confining the head on the mounting, the same including a projecting rim on one end of the mounting and a tongue on the head bearing on the inner side of the rim, and a projection from the end of the beam extending laterally beyond the periphery of said rim, the brake head having diametrically opposite recesses in the wall surrounding its transverse opening and being extended from such opening sufficiently to adapt either recess to receive said lateral projection, whereby to permit the head to be passed in a horizontal position over the laterally projected end of the beam and onto the mounting and turned to vertical position to establish bearing relation between the tongue and the rim.

20. In combination, a brake beam, a brake head and a mounting rigid with the beam and upon which the brake head is rockably supported, the mounting of generally cylindrical shape and the head provided with an annular transverse opening the wall of which surrounds and bears on the mounting, and means for confining the head on the mounting, and a beam guiding extension beyond and associated with the mounting adapted to guide the beam on a car-truck side frame.

21. In combination, a brake beam, a brake head and a mounting rigid with the beam and upon which the brake head is rockably supported, the mounting of generally cylindrical shape and the head provided with an annular transverse opening the wall of which surrounds and bears on the mounting, and means for confining the head on the mounting, and a beam guiding lug extended from the mounting and in which the end of the beam is received, said lug adapted to guide the beam on a car-truck side frame.

22. In combination, a brake beam, a brake head and a mounting rigid with the beam and upon which the brake head is rockably supported, the mounting of generally cylindrical shape and the head provided with an annular transverse opening the wall of which surrounds and bears on the mounting, and means for confining the head on the mounting, and a beam guiding lug extended from the mounting and in which the end of the beam is received, said lug adapted to guide the beam on a car-truck side frame, and said lug being laterally extended in the plane of operation of the beam.

23. In combination, a brake beam, a brake head and a mounting rigid with the beam and upon which the brake head is rockably supported, the mounting of generally cylindrical shape and the head provided with an annular transverse opening the wall of which surrounds and bears on the mounting, and means for confining the head on the mounting, and a spring-pressed clamp on the head protruding inwardly beyond the wall of the transverse opening, and the protruding part and the mounting having corresponding flat mutually bearing surfaces which diverge upwardly and inwardly with respect to the beam, such surfaces adapted to restore the head to vertical position through action by the spring clamp.

24. In combination, a brake beam, a brake head and a mounting rigid with the beam and upon which the brake head is rockably supported, the mounting of generally cylindrical shape and the head provided with an annular transverse opening the wall of which surrounds and bears on the mounting, and means for confining the head on the mounting, a pivoted, spring-pressed clamp on the head protruding inwardly beyond the wall of the transverse opening, and means on the protruding part and the mounting adapted to restore the head to vertical position through the spring action, the head being reversible for use on the mounting and provided with means for removably supporting the clamp pivot in either half of the head, whereby the mounting and head may be associated with either end of the brake beam.

25. In combination, a brake beam, a brake head and a mounting rigid with the beam and upon which the brake head is rockably supported, the mounting of generally cylindrical shape and the head provided with an annular transverse opening the wall of which surrounds and bears on the mounting, and means for confining the head on the mounting, projections from the side of each half of the head, and a flexible resilient member engaged with the projections and with the beam and tending to maintain the head in vertical position.

26. In combination, a brake beam, a brake head and a mounting rigid with the beam and upon which the brake head is rockably supported, the mounting of generally cylindrical shape and the head provided with an annular transverse opening the wall of which surrounds and bears on the mounting, and means for confining the head on the mounting, and a flexible resilient member engaged at its opposite ends with the head and passing through the beam to tend to maintain the head in vertical position.

27. In combination, a brake beam, a brake head and a mounting rigid with the beam and upon which the brake head is rockably supported, the mounting of generally cylindrical shape and the head provided with an annular transverse opening the wall of which surrounds and bears on the mounting, and means for confining the head on the mounting, perforated projections on the sides of the halves of the head, the perforations substantially aligned, and a flexible resilient member secured in the perforations and passing through the beam to tend to maintain the head in vertical position.

28. In combination, a brake beam, a brake head and a mounting rigid with the beam and upon which the brake head is rockably supported, the mounting of generally cylindrical shape and the head provided with an annular transverse opening the wall of which surrounds and bears on the mounting, and means for confining the head on the mounting, and a flexible resilient member secured to the head at opposite sides of the beam and engaged with the beam to tend to maintain the head at substantially right angles to the plane of operation of the beam.

29. In combination, a brake beam, a brake head and a mounting rigid with the beam and upon which the brake head is rockably supported, the mounting of generally cylindrical shape and the head provided with an annular transverse opening the wall of which surrounds and bears on the mounting, and means for confining the head on the mounting, the mounting having a central opening from end to end, and the end of the beam located in and extending beyond the opening to provide an extension for guidance on a truck side frame, and a wear protecting covering over the top, bottom and terminal surfaces of the beam-end, said covering snugly fitting in between the beam and the mounting where the beam passes through the mounting, and means for rigidly securing together the beam-end, covering and mounting.

30. In combination, a brake beam, a brake head and a mounting rigid with the beam and upon which the brake head is rockably supported, the mounting of generally cylindrical shape and the head provided with an annular transverse opening the wall of which surrounds and bears on the mounting, and means for confining the head on the mounting; the mounting having a central diametrical opening from end to end, and the end of the beam substantially flat in the plane of operation of the beam and located in and extending beyond the opening to provide an extension for guidance on a truck side frame, and a flat-sided wear protecting covering over the top, bottom and terminal surfaces of the beam end, said covering snugly fitting in between the beam and the mounting where the beam passes through the mounting, and means for rigidly securing together the beam-end, covering and mounting.

CHARLES R. BUSCH.